United States Patent [19]

Müller

[11] Patent Number: 4,759,679

[45] Date of Patent: Jul. 26, 1988

[54] LOADING DEVICE FOR X-RAY FILM SHEET CASSETTES

[75] Inventor: Jürgen Müller, Munich, Fed. Rep. of Germany

[73] Assignee: Agfa-Gevaert AG, Leverkusen, Fed. Rep. of Germany

[21] Appl. No.: 29,532

[22] Filed: Mar. 23, 1987

[30] Foreign Application Priority Data

Mar. 29, 1986 [DE] Fed. Rep. of Germany ....... 3610660

[51] Int. Cl.⁴ .............................................. B65H 5/08
[52] U.S. Cl. ......................................... 414/416; 271/5;
271/95; 414/627; 414/737; 414/121; 414/404
[58] Field of Search ............... 414/626, 627, 737, 742,
414/728, 120, 121, 122, 416, 403, 404; 271/3, 4,
5, 90, 95, 30.1

[56] References Cited

U.S. PATENT DOCUMENTS

| | | | |
|---|---|---|---|
| 3,111,585 | 11/1963 | Sano et al. | 414/416 X |
| 3,753,509 | 8/1973 | Kock | 414/737 X |
| 4,049,142 | 9/1977 | Azzaroni | 414/403 X |
| 4,509,736 | 4/1985 | Stahl et al. | 271/107 X |
| 4,514,958 | 5/1985 | Hoorn | 414/403 X |

FOREIGN PATENT DOCUMENTS

| | | | |
|---|---|---|---|
| 3232148 | 8/1984 | Fed. Rep. of Germany. | |
| 2607876 | 3/1985 | Fed. Rep. of Germany. | |
| 1147525 | 11/1957 | France | 414/737 |
| 134922 | 3/1952 | Sweden | 271/107 |

Primary Examiner—Frank E. Werner
Attorney, Agent, or Firm—Michael J. Striker

[57] ABSTRACT

A device for loading X-ray film cassettes comprises a housing having a compartment receiving a cassette, a plurality of boxes accommodating film dispensing magazines positioned one above another in the housing, a suction device and transport roller pairs for transporting a film sheet sucked by the suction device towards the cassette. The suction device which includes at least one sucker is displaceable between a dispensing magazine, which contains a film pack corresponding in size to that of the cassette, and the transport roller pairs so as to provide a transport path for the film sheets with very few direction changes.

10 Claims, 6 Drawing Sheets

LOADING DEVICE FOR X-RAY FILM SHEET CASSETTES

BACKGROUND OF THE INVENTION

The present invention relates to a device for loading x-ray film sheet cassettes.

Loading devices of the type under discussion are usually provided with a compartment which is light-tight closable and which receives a cassette. Such loading devices also have means to determine the size of the cassette insertable into that compartment as well as a plurality of superposed boxes or drawers accommodating dispensing magazines containing film sheet packs or stacks of different formats, and also a control device for controlling the dispensing magazine the film format of which corresponds to the film format of the cassette, means for the removal of the film sheets from the dispensing magazine and transporting means for transporting the film sheets removed from the magazine towards the cassette.

Loading devices of the foregoing type have been known. In one of such devices, the dispensing magazines are positioned in the respective drawers or compartments in the open condition and the uppermost film sheet is normally lifted by the sucker positioned in the respective compartment and fed by the transport roller pair assigned to this compartment. The transport plane of these rollers is positioned parallel to the plane of the film stack in the dispensing magazine so that the film sheet must be finally deflected. Such a deflection is carried out, for example by a passage provided for each magazine-containing compartment according to DE-PS No. 2607 876.

In the device disclosed in DE-PS No. 32 32 148 such a deflection is effected by separate passages branched from the transport roller pairs. It must be ensured however in each deflected position that the film sheet being transported be fed into the next roller pair.

SUMMARY OF THE INVENTION

It is an object of the present invention to provide an improved device for loading X-ray film sheet cassettes.

It is another object of the invention to provide a loading device in which numerous superposed passages for film sheets would be avoided and the film sheet path would have few film sheet-direction-changing locations and would be at the same time, very simple.

These and other objects of the invention are attained by a device for loading X-ray film sheet cassettes, comprising a light-proof closable compartment for receiving therein an X-ray film cassette, means to determine a size of the cassette to be insertable into said compartment; a plurality of housing sections superposing each other and receiving dispensing magazines containing film sheet stacks of various film formats; a control device for controlling that dispensing magazine the film format of which corresponds to the size of the cassette inserted into said compartment and for controlling a removal of a film sheet from said dispensing magazine; transport means for transporting said film sheet towards said cassette, said transport means including at least one transport roller pair arranged inside the device before said compartment, and at least one sucker which is displaceable between said roller pair and said dispensing magazine; a drive device which is actuated by said control device for moving said sucker to an upper surface of a film stack in said dispensing magazine and, after sucking of an uppermost film sheet by said sucker, pivoting said sucker away from said film stack and moving said sucker together with the uppermost film sheet separated from said film stack towards said transport roller pair which grip said film sheet from said sucker and deliver said film sheet into said cassette.

According to the invention a single suction device including one or a number of suckers can perform a transportation of a film sheet from the carresponding dispensing magazine to the cassette being loaded wherein the deflection of the film sheet removed from the dispensing magazine towards the transport path is firstly performed and the transport of the film sheet is carried out by the sucker or a number of suckers along the straight transport path. Thereby customary suction devices for each dispensing magazine can be omitted. Furthermore, a conventional deflection of the film sheet, sucked from the dispensing magazine, by means of the first transport roller pair with a horizontal path to a vertical transport roller path can be also avoided.

The device may further include a film transporting chute defining a movement region of said sucker, each dispensing magazine being movable in a respective housing section by means of said control device in an open position towards said chute.

Each housing section may have a free space above a respective dispensing magazine accommodated wherein, said sucker being insertable into said free space when said dispensing magazine is open.

The device may further include at least one guide rod, said drive means including an endless motor-driven cable train for displacing said sucker along said guide rod in two opposite directions.

Said guide rod and said cable train may be positioned in said chute so that they face said dispensing magazines.

In a further embodiment, said guide rod and said cable train may be positioned in said chute laterally of a longitudinal side of each dispensing magazine; the device may include an arm extending perpendicular to said longitudinal side and supporting said sucker.

The device may further include a sleeve surrounding said guide rod and supported thereon, a carrier secured to said cable train and provided with said arm, said carrier supporting a control motor provided with a pinion, said carrier carrying a rotatable toothed sector which is in mesh with said pinion, at least one rotationally supported angular lever coaxial with said sector and carrying said sucker, a stop eccentrically positioned on said sector, and at least one spring which biases said angular lever against said stop.

The device may further include a clamping plate pivotally supported on said carrier for gripping said film sheet from said sucker, and a spring which urges said clamping plate to an initial non-clamping position.

Said clamping plate may have an arm which is arranged in a path of movement of said toothed sector.

The device may also include a spring-biased sensor arranged on said carrier to be moved to and from said film stack, a switch for said control motor, and a vacuum source for said sucker cooperating with said sensor.

The novel features which are considered as characteristic for the invention are set forth in particular in the appended claims. The invention itself, however, both as to its construction and its method of operation, together with additional objects and advantages thereof, will be

DETAILED DESCRIPTION OF THE PREFERRED EMBODIMENTS

Figure 1:
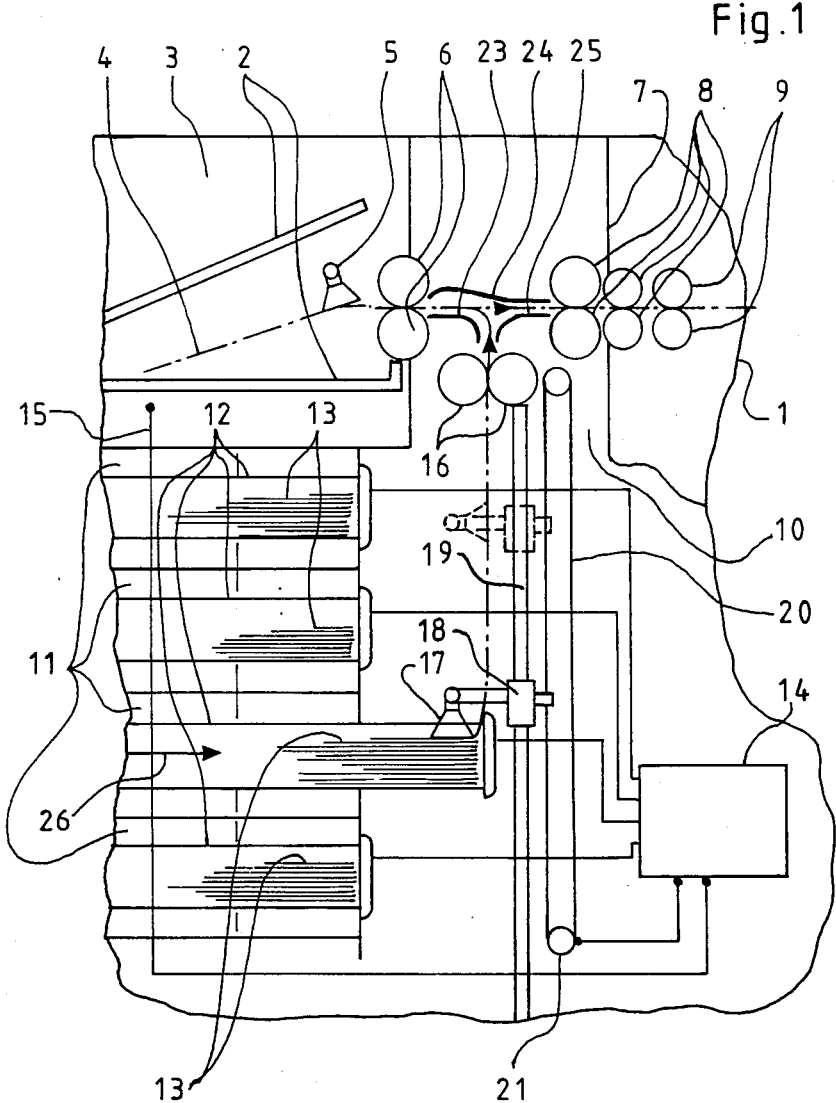
FIG. 1 is a schematic view of the X-ray cassette loading apparatus of the first embodiment of the invention.

Referring now to the drawings in detail and firstly to FIG. 1 thereof, it will be seen that this figure partially illustrates a housing 1 of the film sheet cassette loading-and-unloading device. A light-tight closable compartment 3 is provided in housing 1 for accommodating therein of an X-ray film cassette 2 which is loaded and unloaded. Reference numeral 4 designates an X-ray film sheet. A suction device or sucker 5 is provided to remove a film sheet 4 from the cassette 2 positioned in the compartment 3. A transport roller pair 6 for further transporting of the film sheet sheet 4 is positioned at the end of compartment 3.

Between the cassette compartment 3 and a film developing device 7 or a corresponding film sheet transporting means 8 and a light barrier 9, is provided a vertical film sheet transporting chute 10, into which housing sections or compartments 11 for film sheet supply and dispensing magazines 12 open. These dispensing magazines 12 each contain a film sheet stack 13. Stacks 13 of different magazines contain film sheets of different formats and sizes to be used in the cassette 2. By means of the known and non-illustrated device for determining the size of the given cassette 2 and thus the size and format of the film sheet are determined and fed into a computer or a comparator device or any other suitable electronic control device which is schematically shown in the drawing and denoted by reference numeral 14. The conventional format-determining device is schematically designated by a conduit 15.

A transport train for the projected film sheet 4 removed from cassette 2 conveys the film sheet from the roller pair 6 to rollers 8 and into the developing machine 7 or a collecting container. A feeding transport train for loading the given cassette 2 opens either from below or from above, depending on the arrangement of the boxes or compartments 11 relative to the compartment 3, into the aforementioned film sheet removing transport train. The film sheet feeding transport trains or film sheet feeding means are formed by a roller pair 16 and a suction device 17, 18 positioned in the transport plane perpendicular to the plane of transport of the roller pair 6. The actuation of the suction device 17, 18 is controlled by the control device 14. The roller pair 16 is positioned sufficiently remote from the roller pair 6 and between the roller pair 6 and roller pair 8 so that the film sheet 4 fed by the roller pair 16 to the roller pair 6 can be deviated. Thereby to prevent the film sheet 4 being transported from the cassette 2, from passing through the roller pair 16 and the film sheet transported by the roller pair 16 from passing through the roller pairs 8, deflecting guide surfaces 23 to 25 are provided between roller pairs 6, 16 and 8, which guide surfaces reliably direct or guide, due to their curved faces, the film sheet being transported towards the cassette or from the cassette 2, respectively.

The preferred embodiments of the present inventions will be explained below under assumption that a film sheet stack of a predetermined size being loaded into cassette 2 is located in a respective dispensing magazine transported into a transport chute 10 by means of the control device 14 and a non-shown but conventional drive device in an open position. Thus the suction device 17 would be moved from above relative to a respective film sheet stack 13. As shown in FIG. 1 this is the position of the second dispensing sing magazine moved into the transport chute 10. The preparation of the respective magazine 12 can be performed by any suitable transport means.

The suction device 17, 18 includes at least one sucker 17, preferably a pair of suckers or a number of simultaneously operating suckers. The suction device 17, 18 is displaceable longitudinally by means of a guide rod 19 and is connected with a movable cable train or tow 20 for the movement of the sucker 7 in the upward and downward directions. The drive 21 of the tow 20 is also controlled by the control device 14 so that the sucker 17 is applied to the uppermost sheet of the respective film sheet stack of the magazine which corresponds to the format or size of the film sheet being loaded to the cassette 2 and which is also moved into the preparation position in the transport chute 10.

After the uppermost film sheet has been sucked by the sucker 17 the latter is pivoted by approximately 90° so that this film sheet is separated from the stack. Then one or a number of suckers 17 in their pivoted position are moved together with the film sheet attached thereto upwardly (or downwardly) to the roller pair 16 by means of the tow 20 along the guide rod 19. As soon as the upper edge of the film sheet reaches the roller pair 16, rollers 16 are switched on into motion and grip the film sheet whereas the suction device 17, at this time, is switched off. The film sheet being transported is fed by means of roller pairs 16, 6 to the cassette 2 being loaded. The suction device remains in this position until it receives a signal from the control device 14 for a new control of the ready-to-operate dispensing magazine.

FIGS. 2 through 6 show an embodiment of the device for controlling and actuation of the sucker 17. This embodiment differs from that of FIG. 1 in that the cable train 20 and the guide rods 19 in the transport chute 10 are arranged at both sides of compartments 11 or dispensing magazines 12 in the direction of sliding 26 of each magazine. A boom or arm 27, 27a is secured to each guide sleeve 18. Each boom or arc 27, 27a is formed as a right-angled or angular element and extends above the region of the open dispensing magazine 12 transported to the chute 10 and also above its film sheet stack 13. At the free end of the arm portion 27a, is secured a carrier 28 directed downwardly. A respective feeding hose 29 leading to a known and non-shown vacuum source and connected to the sucker 17 can be movably attached to the carrier 28. A motor 30 with a pinion 31 is secured to carrier 28 whereby the operation of the this motor is controllable by control device 14. A toothed sector 32 rotationally supported on the carrier 28 is in mesh with the pinion 31. An angular rotatable lever 34 is rotationally supported on an axle 33 of the toothed sector 32. This lever 34 is biased by a spring 35 against a stop 36 provided on the toothed sector 32. Lever 34 carries at the free end thereof a sleeve 34a which surrounds a collar or neck 17a of the sucker 17. A buffer spring 37 is provided between sucker 17 and sleeve 34a.

Also an approximation switch 38, 39 is arranged on the carrier 28, the actuation of which switch causes the control device 14 to apply sucker 17 onto the uppermost film sheet 13a of the film sheet stack 13. Further an angle 41 is pivotally supported on the carrier 28, this angle 41 being biased against the stop on that carrier by means of a spring 40. Angle 41 is arranged in the path of movement of a control arm 32a of the toothed sector 32 and has a clamping plate 42 on one end thereof.

Those elements of the device of the invention which are less important for its operation are not discussed in detail.

Figure 2:
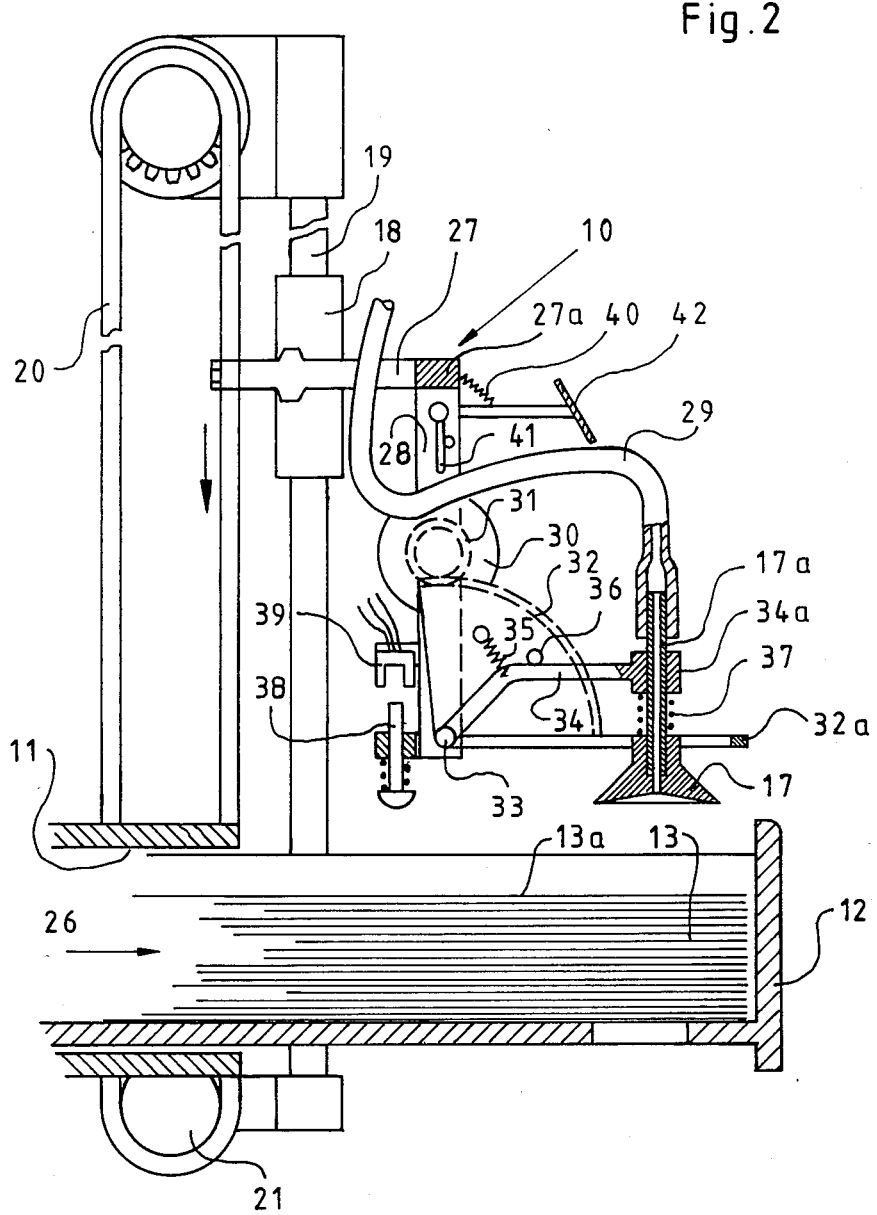
FIG. 2 is a schematic side view of the suction device during the control of a dispensing magazine of the apparatus according to another embodiment of the invention.

The mode of operation of the suction device shown in FIGS. 2 to 6 is as follows:

In the position of FIG. 2 the entire suction device is moved by means of the cable train 20 to the film sheet stack 13. The toothed sector 32 is, at this time, in its initial position. The angular lever 34 is held against the stop 36. The approximation switch 38, 39 is open. The clamping plate 42 is in its inclined position.

Figure 3:
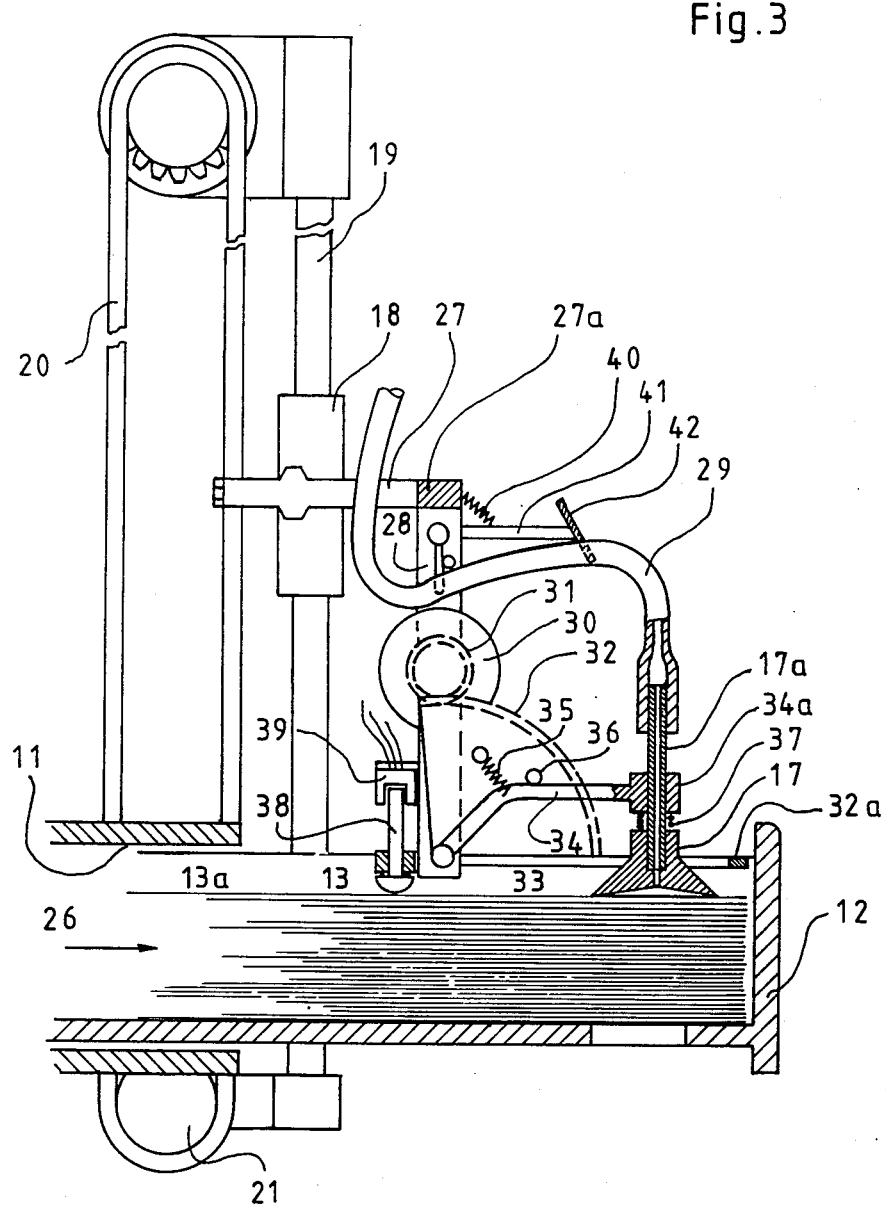
FIG. 3 is a schematic side view of the device of FIG. 2 in the position of sucking of the uppermost film sheet from the film stack positioned in the controlled dispensing magazine.

In the position shown in FIG. 3 sucker or suckers 17 and the approximation switch 38, 39 having a sensor 39 are applied to the outer face of the uppermost sheet 13a of the stack 13. The buffer spring 37 is compressed and the approximation switch 38, 39 becomes closed. This approximation switch 38, 39 issues a signal to the control device 14 so as to apply vacuum at the sucker 17 so that the latter sucks the uppermost sheet 13a, and to set motor 30 into operation for the movement of the sucker.

Figure 4:
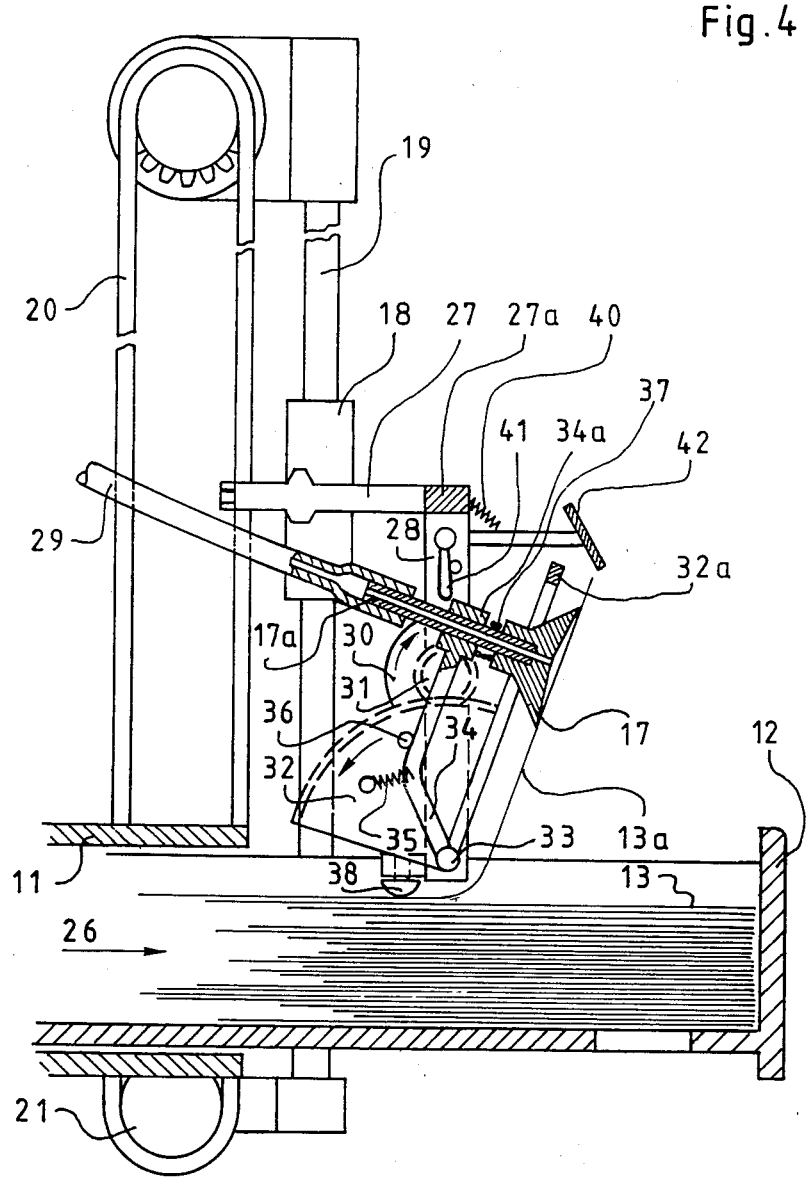
FIG. 4 is a schematic side view of the device of FIGS. 2 and 3 in the position of the separation of the uppermost film sheet from the stack.

In the position depicted in FIG. 4, pinion 31 drives the toothed sector 32 so that the sucked sheet 13a is separated from the stack due to the movement of the sucker and the front edge of the uppermost film sheet 13a is pivoted by 90°.

Figure 5:
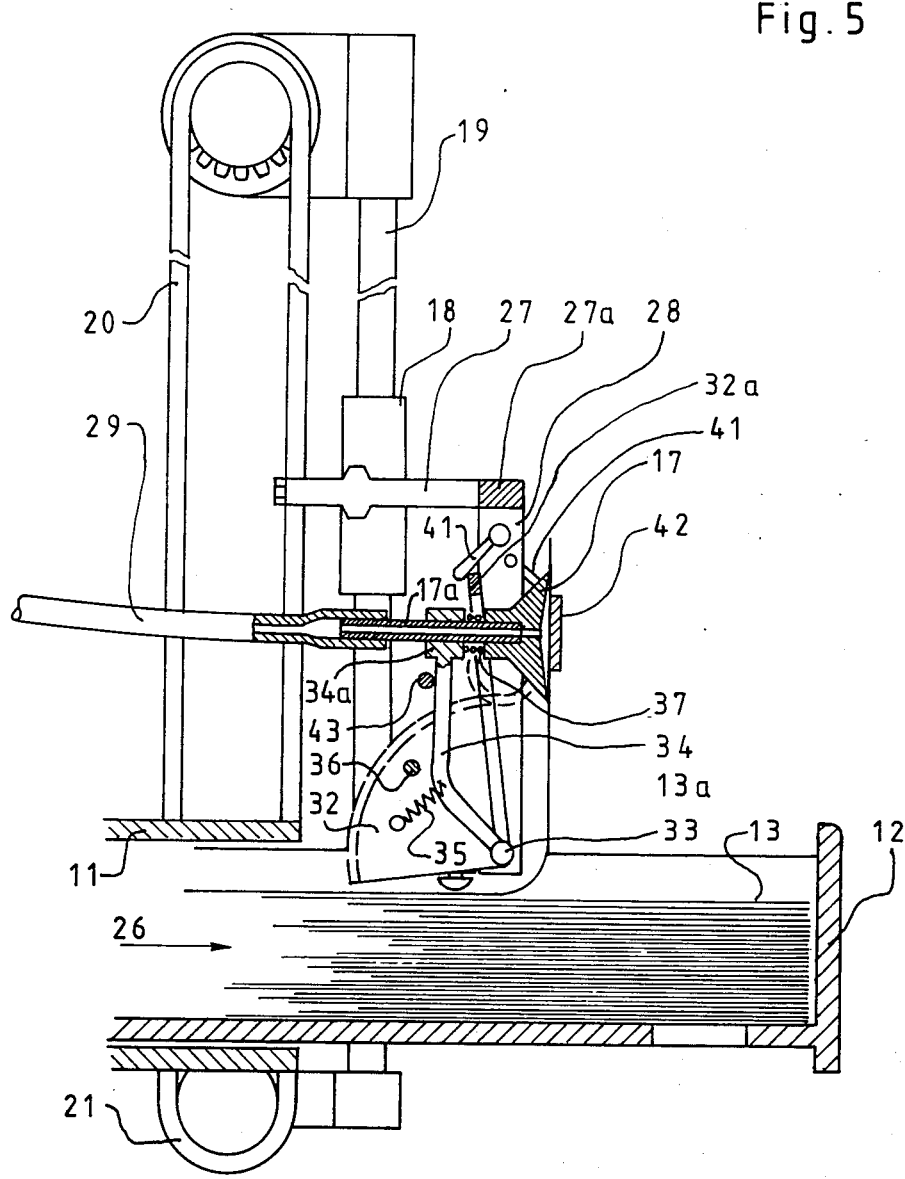
FIG. 5 is a schematic view of the device of FIGS. 2 to 4 in the position of transporting a film sheet towards the cassette.
Figure 6:
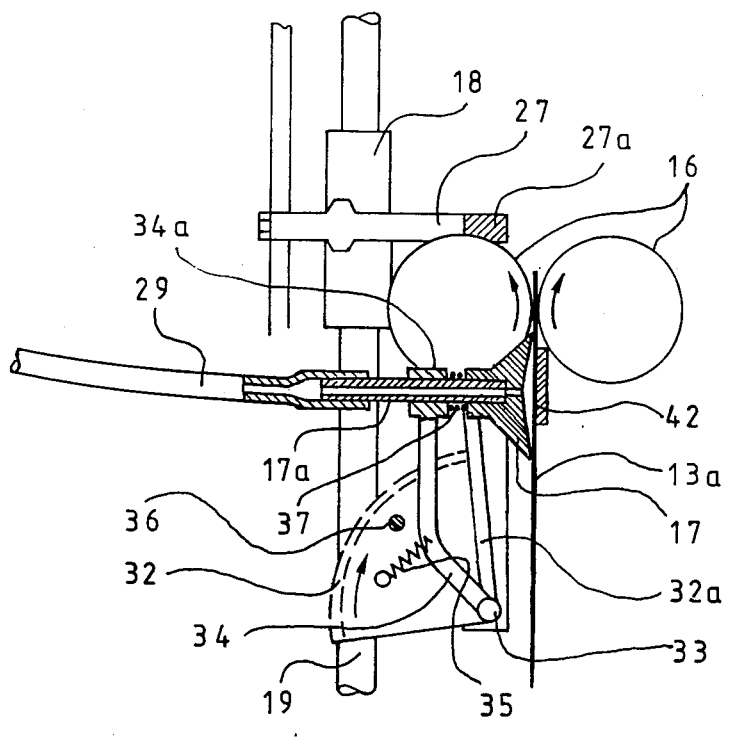
FIG. 6 is a partial schematic view, partially in section, of the device of FIGS. 2 through 5, in the position of transmitting a film sheet by the suction device to the transport roller pair leading to the film cassette.

In the position shown in FIG. 5, the angular lever 34 after being pivoted by about 90°, is rotated relative to the stop 43 provided on the carrier 28 and is lifted from the stop 36 under stressing of the spring 35. The control arm 32a also rotates the other angular lever 41 so that the clamping plate 42 clamps film sheet 13a additionally to the sucker 17 and thus reliably holds the latter. In this position the control device 14, via a non-shown switch, switches on the drive motor 21 of the cable train 20 and switches off the control motor 30 so that the whole suction device is now transported upwardly until the front edge of the film sheet reaches the feeding roller pair (FIG. 1 or FIG. 6). By means of the control device 14 the feeding roller pair is switched on into motion and grips the film sheet 13a. Vacuum is now switched off from the sucker 17 and the latter is shifted from the film sheet 13a and this film sheet passes over the clamping plate 42 and is fed through roller pairs 16, 6 into the cassette 2.

Upon loading of the next cassette the suction device is returned to the position according to FIG. 2 and the whole process is repeated.

In place of the embodiments described herein above other possibilities can be offered. For example in order to maintain the controllable open dispensing magazine 12 in its box or compartment 11 the height of this compartment can be increased so as to enable the sucker 17 to pivot into said compartment and to move into contact with the stack positioned therein. It is also possible to omit the roller pair 16 and the guide surfaces 23 to 25 and to guide the film sheet being transported directly by further pivoting of the sucker 17 up to the roller pair 6. The control device for the suction device can be arranged on the other reversed side relative to that of FIG. 1; the angular lever 34 can be enlarged to be inserted into the compartment 11 or otherwise formed, for example multi-angled and the toothed sector 32 can be provided with a greater angular region.

It will be understood that each of the elements described above, or two or more together, may also find a useful application in other types of devices for loading X-ray film sheet cassettes differing from the types described above.

While the invention has been illustrated and described as embodied in a device for loading X-ray film sheet cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for loading X-ray film sheet cassettes, comprising a light-proof closable compartment for receiving therein an X-ray film cassette, means to determine a size of the cassette to be insertable into said compartment; a plurality of housing sections superposing each other and receiving film dispensing magazines containing film sheet stacks of various film formats; a control device for controlling that dispensing magazine the film format of which corresponds to the size of the cassette inserted into said compartment and for controlling a removal of a film sheet from said dispensing magazine; transport means for transporting said film sheet towards said cassette, said transport means including at least one transport roller pair arranged inside the device downstream of said compartment, and at least one sucker which is displaceable between said roller pair and said dispensing magazine; means to open said dispensing magazine; a drive device which is actuated by said control device for moving said sucker to an upper surface of a film stack in said dispensing magazine and, after sucking of an uppermost film sheet by said sucker, pivoting said sucker away from said film stack and moving said sucker together with the uppermost film sheet separated from said film stack towards said transport roller pair which grip said film sheet from said sucker and deliver said film sheet into said cassette.

2. The device as defined in claim 1, further including a film transporting chute defining a movement region of said sucker, said dispensing magazine being movable in a respective housing section by means of said control device in an open position towards said chute.

3. The device as defined in claim 1, wherein each housing section has a free space above a respective dispensing magazine accommodated therein, said sucker being insertable into said free space when said dispensing magazine is open.

4. The device as defined in claim 2, further including at least one guide rod, said drive device including an endless motor-driven cable train for displacing said sucker along said guide rod in two opposite directions.

5. The device as defined in claim 4, wherein said guide rod and said cable train are positioned in said chute so that they face said dispensing magazines.

6. The device as defined in claim 4, wherein said guide rod and said cable train are positioned in said chute laterally of a longitudinal side of each dispensing magazine; and further including an arm extending perpendicular to said longitudinal side and supporting said sucker.

7. The device as defined in claim 6, further including a sleeve surrounding said guide rod and supported thereon, a carrier secured to said cable train and provided with said arm, said carrier supporting a control motor provided with a pinion, said carrier carrying a rotatable toothed sector which is in mesh with said pinion, at least one rotationally supported angular lever coaxial with said sector and carrying said sucker, a stop eccentrically positioned on said sector, and at least one spring which biases said angular lever against said stop.

8. The device as defined in claim 7, further including a clamping plate pivotally supported on said carrier for gripping said film sheet from said sucker, and a spring which urges said clamping plate to an initial non-clamping position.

9. The device as defined in claim 8, wherein said clamping plate has an arm which is arranged in a path of movement of said toothed sector.

10. The device as defined in claim 7, further including a spring-biased sensor arranged on said carrier to be moved to and from said film stack, a switch for said control motor, and a vacuum source for said sucker cooperating with said sensor.

* * * * *